United States Patent [19]

Yu

[11] Patent Number: 6,127,616
[45] Date of Patent: Oct. 3, 2000

[54] METHOD FOR REPRESENTING MUSICAL COMPOSITIONS USING VARIABLE COLORS AND SHADES THEREOF

[76] Inventor: Zu Sheng Yu, 253 Marshall Ave., West Hempstead, N.Y. 11552

[21] Appl. No.: 09/095,626

[22] Filed: Jun. 10, 1998

[51] Int. Cl.[7] .................................................. G09B 15/02
[52] U.S. Cl. ........................................ 84/483.2; 84/483.1
[58] Field of Search ................................. 84/478, 477 R, 84/470 R, 479 A, 485 R, 483.1, 483.2

[56] References Cited

U.S. PATENT DOCUMENTS

| | | | |
|---|---|---|---|
| 3,612,670 | 10/1971 | Phillips | 352/5 |
| 5,496,179 | 3/1996 | Hoffman | 434/433 |
| 5,540,132 | 7/1996 | Hale | 84/470 |

Primary Examiner—Robert E. Nappi
Assistant Examiner—Kim Lockett
Attorney, Agent, or Firm—Edward Etkin, Esq.

[57] ABSTRACT

The method of the present invention enables representation of musical compositions using symbols and color. Symbols and variable shades of colors are used to provide enhanced and visually attractive representation of a musical composition that guides a performer in performing the composition in particular predefined emotional overtones. An color-coded emotional hint line is provided along with colored representations of notes to further assist the performer in setting an appropriate predefined overall emotional tone when the composition is performed.

9 Claims, 5 Drawing Sheets

(4 of 5 Drawing Sheet(s) Filed in Color)

FIG. 4

## ### ## ### ## ### ## ### ## ### ## ### ## ###
a cd fga cd fga cd fga cd fga cd fga cd fga cd fga b de gab de gab de gab de gab de gab de gab de gab
♭= b bb bbb bb bbb bb bbb bb bbb bb bbb bb bbb bb bbb

COLOR KEYBOARD (INSTRUMENT)

COLOR MUSICAL NOTE

```
                   1111111222222233333334444445
ABCDEFGABCDEFGABcdefgabcdefgabcdefgabcdefgabc
22111111
```

METHOD FOR REPRESENTING MUSICAL COMPOSITIONS USING VARIABLE COLORS AND SHADES THEREOF

BACKGROUND OF THE INVENTION

1. Field of the Invention

The present invention relates to a method for representing musical compositions using symbols and color. More particularly, the invention is directed to a method for using symbols and variable shades of colors to provide enhanced and visually attractive representation of a musical composition that guides a performer in performing the composition in particular predefined emotional overtones.

2. Description of the Related Art

Musical compositions are typically represented by a music notation system. Various music notation systems are well known in the art. Some notations have been in use for many centuries.

Musical symbols are currently denoted in two different prevalent systems: the European system also known as "tablature" and the simplified system also known as "note shift". The tablature system has a great deal of functionality and sophistication allowing very complex musical compositions to be represented. As a result, the tablature system is more popular and is in far greater use among musicians that the note shift system. However, due to its complexity, the tablature system is very difficult to learn and use.

Proficient use of the tablature system requires extensive and repetitive memorization and practice of each note and symbol used in the notation. For example, the pitch of a particular note is determined by the note's position on the staff, while the duration of the note is determined by its shape. Tablature note positioning is problematic because it is relatively easy to misread and difficult to differentiate the notes visually. Furthermore, the shapes that determine duration of the notes are neither structured nor logical. For example, the sharp "#" symbol cannot be intuitively interpreted as to its meaning. Mastery of it is more a matter of repetitive or habitual usage. It is neither easy to compose/write nor to integrate into modern technology.

Attempts have been made to assist those interested in playing simple compositions by color-coding portions of a musical instrument, such as metal bars in a xylophone, and then providing a sequence of color shapes that represent a sequence of portions of the instrument that must be manipulated (e.g. struck) in order to produce a composition. In essence, each color shape represents a note. However, this approach does not even come close to addressing complexities of typical music compositions and has no provisions whatsoever for pitch, beat, cadence or any other music symbology. Furthermore, the colors selected to represent the various notes are not selected with any particular methodology and do not in themselves convey any additional information to a musician.

It would thus be desirable to provide an improved music notation system that is intuitive, easy to read, write and learn. It would further be desirable to provide a method for guiding a performer to perform a music composition in particular emotional overtones. It would also be desirable to provide method for converting an existing musical composition into a visually attractive colorful arrangement indicative of emotional overtones and moods of the musical composition.

SUMMARY OF THE INVENTION

The disadvantages and limitations discussed above are overcome by the present invention. Symbols and variable shades of colors are used to provide enhanced and visually attractive representation of a musical composition that guides a performer in performing the composition in particular predefined emotional overtones. Notes are represented by geometric shapes of various colors, while music symbols are represented by different geometric shapes superimposed over appropriate portions of the notes. In each particular note the color may be of multiple shades from a light shade to a dark shade with a predetermined number of gradations. The shade of the note determines bass and treble pitches. A color-coded emotional hint line is provided along with colored representations of notes to further assist the performer in setting an appropriate predefined overall emotional tone when the composition is performed.

The colors used for the notes and the emotional hint line are selected to correspond to expression of various emotional and mood states. For example red colors are used to represent aggressive, warm and passionate emotions, while blue colors represent coolness and serenity. Thus, a musician may gain understanding of an overall mood and style of the music composition of the present invention merely by glancing at it.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The file of this patent contains at least one drawing executed in color. Copies of this patent with color drawings will be provided by the Patent and Trademark Office upon request and payment of the necessary fee.

In the drawings, wherein like reference characters denote corresponding or similar elements throughout the various figures:

FIG. 4 is representative of an exemplary keyboard of a musical instrument designed to implement the music notation system of FIGS. 1A and 1B in accordance with the principles of the present invention.

DETAILED DESCRIPTION OF THE PRESENTLY PREFERRED EMBODIMENTS

The invention of color representation of musical notes and symbols can be used to improve, enrich and enhance the writing, reading, and performance of musical compositions and to overcome the shortcomings of the tablature and note shift systems. The music notation system of the present invention is easy to learn and use because notes and other musical symbols are represented by colored geometric shapes.

Preferably, each note or symbol has its own color and shape with structure and logic in mind. For example, the notes may be represented by squares and rectangles, 1C may be represented by the color blue, 3E by the color green, and 5G by the color orange. Each musical symbol may also be represented by a different geometric shape of varying color. For example a sharp may be represented by a red upward triangle, while a flat may be represented by a downward pointing blue triangle. The beat and cadence of a musical composition may be denoted by spatial arrangement of the notes, while octaves may be represented by a particular shade of a color. As a result the color representation of the musical composition in accordance with the present invention adds an entirely new visually appealing dimension to the music.

A color-coded emotional hint line is provided along with colored representations of notes to further assist the performer in setting an appropriate predefined overall emotional tone when the composition is performed. The colors used for the notes and the emotional hint line are selected to correspond to expression of various emotional and mood states. For example red colors are used to represent aggressive, warm and passionate emotions, blue colors represent coolness and serenity, while green colors represent peace, harmony, and gentleness. The emotional hint line enables the composition's author to convey a particular mood or emotion or set of moods and emotions in a continuous manner as opposed to conveyance by individual notes which is more discrete in nature.

The hint line can easily convey changes in emotion or mood as gradual or abrupt as the artist desires. The full range of emotions can be expressed via the use of the spectrum of colors and shades utilized in representing the various notes, from blue color representing a low pitch tone to red representing a high pitch tone. As a result, the combination of color coded notes and the emotional hint line enables the expression of the emotion and mood of the musical composition more completely than either technique alone. Thus, a musician may gain understanding of an overall mood and style of the music composition of the present invention and of sections thereof merely by glancing at it. This aspect of the invention is demonstrated by a comparacent of FIGS. 2A and 2B and 3A and 3B below.

Figure 1A:
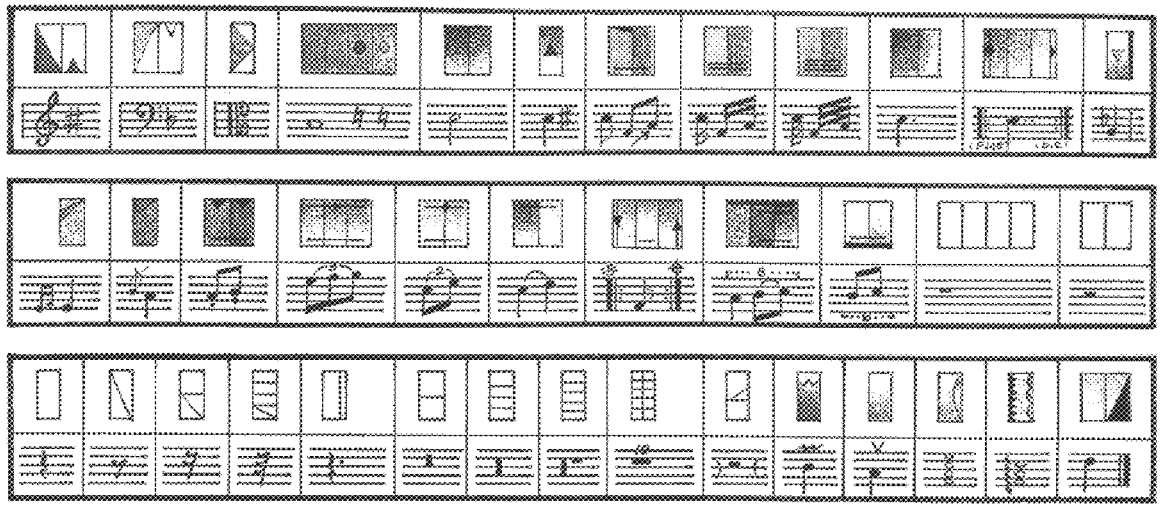
FIG. 1A depicts an exemplary guide for converting tablature-represented musical compositions into the music notation system of the present invention.
Figure 1A:
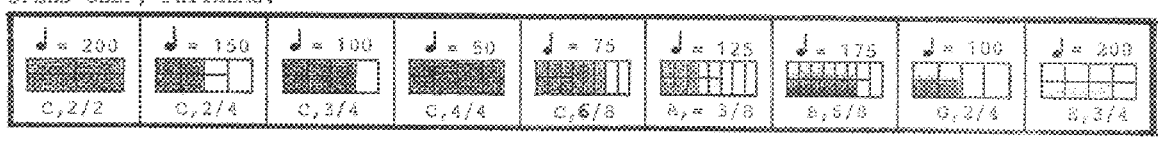
Figure 1A:
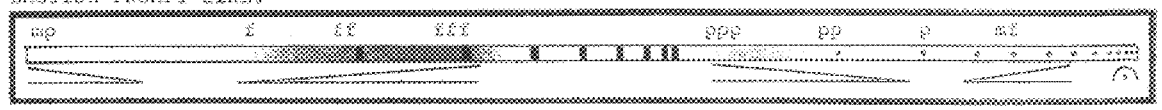

FIG. 1A depicts an exemplary system of representing notes and musical symbols of the tablature system using the color-coded system of the present invention. It should be understood to one skilled in the art that the particular geometric shapes, such as triangles used for sharp and flat notes, are exemplary and may readily be replaced with other geometric shapes as a matter of design choice. Furthermore, this system can also be implemented in keyed or percussion instruments by coloring the keys or pads in a manner substantially similar to the note each key and/or pad represents.

Figure 1B:
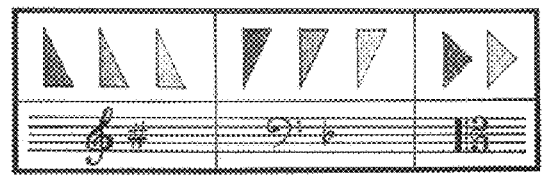
FIG. 1B depicts an exemplary guide for representing bass and treble pitches, respectively in accordance with the music notation system of FIG. 1A.

Referring to FIG. 1B, the representation of each color musical note and symbol as well as each color of the instrument keys or pads is preferably grouped into several shades; a pale shade at one end of the geometric shape or key gradually deepening to a deep shade of the color at another end of the geometric shape or key. Various levels of shades may be used as a matter of design choice. The exemplary FIG. 1B shows approximately 5 levels of shade for each color. These various color levels are the basis for the full range of a note's pitch and also determine how a musical composition can be adjusted to various tones. For example C can go from a deep blue (representing bass pitch) to light blue (representing treble pitch). A musician can take advantage of the tremendous variation of shades in the spectrum of each particular color to fine-tune and customize his or her musical composition.

Figure 2A:
FIGS. 2A and 2B depict exemplary musical compositions represented by the prior art tablature music notation system.
Figure 2B:
Figure 3A:
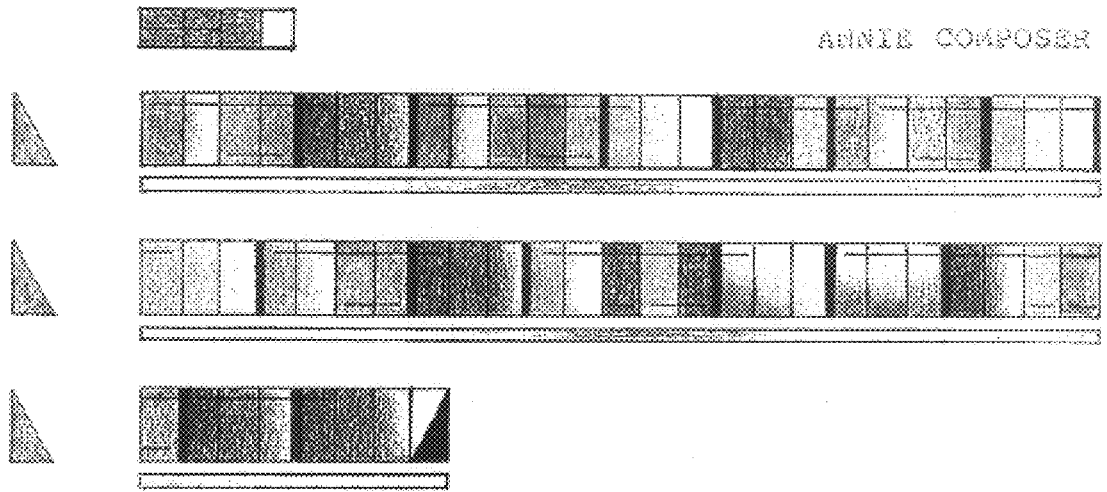
FIGS. 3A and 3B depict the musical compositions of FIGS. 2A and 2B, respectively, represented using the music notation system of FIGS. 1A and 1B in accordance with the present invention.
Figure 3B:
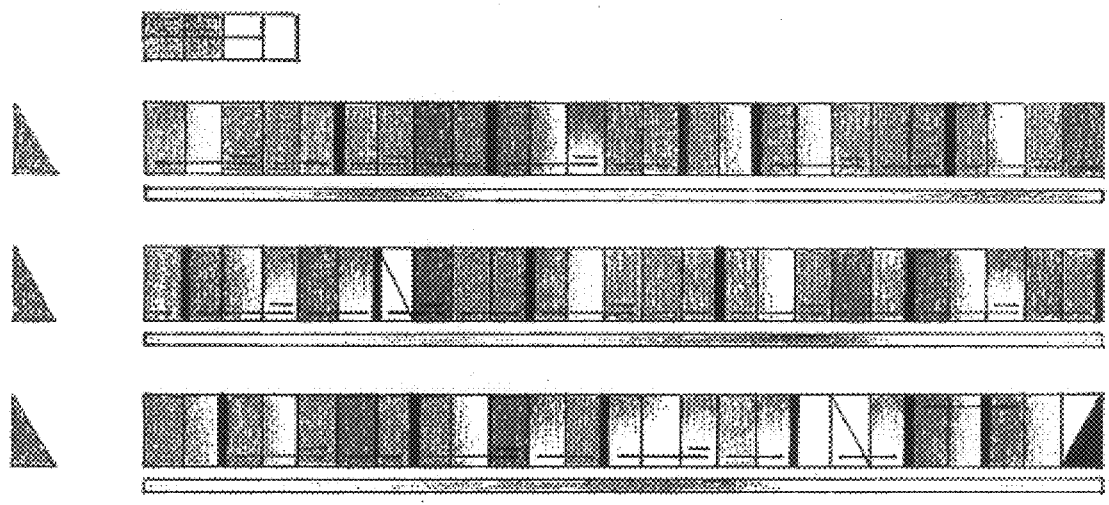

FIGS. 2A and 2B depict two famous songs called "Lullaby" and "Celebrate A New York", respectively, using the traditional tablature method. In contrast, FIGS. 3A and 3B show the same songs represented using the exemplary embodiment of the present invention of FIGS. 1A and 1B. The representations of "Lullaby" and "Celebrate A New York" in accordance with the present invention shown in FIGS. 3A and 3B are not only easy to read but is also visually appealing. For example, a musician reading or performing "Lullaby" in accordance with the present invention is guided in various sections of the song by the colors and shades of the notes and the emotional hint lines of each song section. Simply by glancing at the "Lullaby" song of FIG. 3A the musician is immediately informed of the song's soft, calming and peaceful nature by the prevalence of greena and blue colors. On the other hand, the red colors of "Celebrate A New York" of FIG. 3B, inform the musician of the requirement of bright and aggressive playing when performing that song.

The method of the present invention may also be implemented in various musical instruments to facilitate performance of musical compositions represented in accordance with the present invention. An exemplary colored keyboard for a keyboard instrument such as a piano is shown in FIG. 4. Finally, the color-based method of music notation of the invention lends itself to easy representation and implementation in computer music instruction and instrument software.

With gradual and deeper understanding of the present inventive music notation method, a musician who practices the inventive system is able to compose music with a strong sense of color, thereby being capable of producing a "color emphasized" musical composition that can express emotions and moods more effectively than music composed with the traditional tablature system. For example, in accordance with FIG. 2, if C, D, and E are used in the range, and if bass pitch makes up 80% of the musical composition while the treble pitch makes up 20%, the resulting composition will have a tendency to be represented in shades of blue and will most likely be a serene and peaceful melody, such as for example, the "Lullaby" song of FIG. 3A. Such a musical work will give the listener a feeling of spaciousness and serenity. On the contrary, in another example, when a composition is represented by predominantly warm colors (e.g. F, G, a, B), such as the "Celebrate A New York" song of FIG. 3B, then the emotional overtone of the music will be passionate, bright and warm.

Finally, the present invention contemplates conversion of numerous existing songs and musical composition into the disclosed color-coded notation system to create colorful and visually appealing works of art. For example, a person may want to convert his or her favorite song or melody into the color coded notation system so that they can display the resulting multi-colored sheet as a work of art.

The present inventive method of using color-coded musical notes and color-keyed musical instruments along with the emotional hint line used in music compositions provide a wide range of flexibility for a musician to express emotional tones and/or moods of the composition when creating the composition. The inventive method also enhances a musician's ability to precisely grasp and interpret the mood and emotional tone of a musical composition, especially when performing the composition spontaneously and without much practice.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A music notation method for representing a musical composition comprising a plurality of notes and having a plurality of portions, comprising the steps of:

(a) assigning, to each of the plural notes, a predefined colored geometric shape having a first end and an opposed second end, wherein the color of each said shape varies from a lighter shade at said first end to a darker shade at said second end;

(b) assigning, to at least a portion of the plural notes, a plurality of additional geometric shapes, each of said plural additonal geometric shapes being superimposed over at least one of said predefined geometric shapes, wherein each of said additional geometric shapes is representative of a tablature musical notation symbol; and (c) providing an elongated geometric shape for each of the plural musical composition portions, each said elongated shape being positioned proximal to a corresponding said plural musical composition portion and comprising a plurality of colors, each color being of a plurality of shades, wherein each of said plural colors is representative of a predetermined emotional overtone for performing a particular musical composition portion, and wherein each of said plural shades is indicative of an intensity of said predetermined emotional overtone.

2. The music notation method of claim 1, wherein said predefined geometric shape is one of a square and a rectangle.

3. The music notation method of claim 1, wherein said color of each said shape varies in at least five different shades.

4. The music notation method of claim 1, wherein said color of each said plural geometric shape is selected to represent at least one particular emotional overtone, and wherein said variable shades are indicative of intensity of said at least one emotional overtone.

5. A method for enhancing a musical instrument having a plurality of keys representing a plurality of notes, comprising the step of:

(a) assigning, to each of the plural keys, a predefined colored geometric shape having a first end and an opposed second end, wherein the color of each said shape varies from a lighter shade at said first end to a darker shade at said second end, wherein said color of each said plural geometric shape is selected to represent at least one predefined emotional overtone, and wherein said variable shades are indicative of intensity of said at least one emotional overtone.

6. The method of claim 5, wherein said predefined geometric shape is one of a square and a rectangle.

7. The method of claim 5, wherein said color of each said shape varies in at least five different shades.

8. The music notation method of claim 1 wherein said lighter shade is representative of a treble pitch and wherein said dark shade is representative of a bass pitch.

9. The method of claim 5 wherein said lighter shade is representative of a treble pitch and wherein said dark shade is representative of a bass pitch.

* * * * *